US010776372B2

(12) United States Patent
Chung et al.

(10) Patent No.: US 10,776,372 B2
(45) Date of Patent: Sep. 15, 2020

(54) METHOD FOR COMPUTING SUPPORT OF ITEMSET CANDIDATE BASED ON GRAPH STRUCTURE DATA AND APPLICATION THEREOF

(71) Applicant: Research Institute of Tsinghua University in Shenzhen, Shenzhen (CN)

(72) Inventors: Yeh-Ching Chung, Shenzhen (CN); Rui Zhang, Shenzhen (CN); Wenguang Chen, Shenzhen (CN)

(73) Assignee: Research Institute of Tsinghua University in Shenzhen, Shenzhen (CN)

( * ) Notice: Subject to any disclaimer, the term of this patent is extended or adjusted under 35 U.S.C. 154(b) by 0 days.

(21) Appl. No.: 16/718,305

(22) Filed: Dec. 18, 2019

(65) Prior Publication Data

US 2020/0125562 A1   Apr. 23, 2020

Related U.S. Application Data (63) Continuation of application No. PCT/CN2017/096672, filed on Aug. 9, 2017.

(51) Int. Cl.
  *G06F 16/00* (2019.01)
  *G06F 16/2458* (2019.01)
  *G06F 16/901* (2019.01)

(52) U.S. Cl.
  CPC ...... *G06F 16/2465* (2019.01); *G06F 16/9024* (2019.01)

(58) Field of Classification Search
  None
  See application file for complete search history.

(56) References Cited

U.S. PATENT DOCUMENTS 8,655,911 B2 * 2/2014 Li ................ G06F 16/24561
                                                    707/776
9,569,729 B1 * 2/2017 Oehrle ................. G06Q 10/063
(Continued)

FOREIGN PATENT DOCUMENTS

CN    102096719 A    6/2011
CN    102609528 A    7/2012
CN    103778151 A    5/2014

*Primary Examiner* — Son T Hoang
(74) *Attorney, Agent, or Firm* — IPro, PLLC (57) ABSTRACT

The present disclosure provides a method for computing a support of an itemset candidate based on graph structure data, a method for determining a frequent itemset using the same, and a method for determining a frequent itemset based on a prefix tree. The method for computing a support of an itemset candidate based on graph structure data comprises: converting data in a database to graph structure data (S101); obtaining an itemset candidate from the database (S102); obtaining a connected component corresponding to the itemset candidate in the graph structure data (S103); determining the number of vertices included in the connected component (S104); and determining the number of vertices as the support of the itemset candidate (S105). The method for computing the support of the itemset candidate based on the graph structure data and the method for determining the frequent itemset using the same provided by the embodiments of the present disclosure may avoid spending too much time in obtaining the support of the itemset candidate by scanning the database, which improves efficiency of the algorithm while ensuring effectiveness of the algorithm.

15 Claims, 6 Drawing Sheets

(56) References Cited

U.S. PATENT DOCUMENTS

| | | |
|---|---|---|
| 10,242,258 B2* | 3/2019 | Guo ........................ G06F 16/58 |
| 2011/0078189 A1 | 3/2011 | Bonchi |
| 2011/0137930 A1* | 6/2011 | Hao .................... G06F 16/9024 |
| | | 707/769 |
| 2013/0159318 A1* | 6/2013 | Xu .......................... G06F 40/16 |
| | | 707/748 |

* cited by examiner

Algorithm FIM_GC ($D$, $T$, $I$, $G$)
/* $D$ is the set of transaction records */
/* $T$ is the prefix tree with level and $T = \varnothing$ initially */
/* $I$ is the set of all items in $D$ */
/* $G$ is the converted graph data of $D$ */
1. Convert $D$ to $G$ based on rules 1 and 2;
2. Build the 1-level prefix tree $T'$;
3. $T = T \cup T'$; $k = 1$;
4. do
5. {
6.     For each $k$-itemset candidate in $T$ do
7.     {
8.         $s$ = FIM_CC ($G$, $k$-itemset.$attribute\_set$);
9.         if ($s$ > minimum support)
10.            the support of the $k$-itemset is $s$;
11.         else the support of the $k$-itemset is -1;
12.     }
13.     $k$++;
14. } while (Candidates_Generation($k$, $T$) produce new nodes)
End of FIM_GC

Algorithm FIM_CC ($G$, $attribute\_set$)
1. labels = {0, ..., |$V$-1|} initialized such that labels[$i$]=$i$;
2. for each edge $e$ in $G$ do $F_e$($e$, $attribute\_set$);
3. Return the counter of vertices in the connected component;
End of FIM_CC

Function $F_v$ ($vertex$, $new\_label$)
1. labels[$vertex$] = $new\_label$;
End of $F_v$

Function $F_e$ ($edge$, $attribute\_set$)
1. if ($attribute\_set$ is a subset of attributes of $edge$)
2. {
3.     $m$ = min(labels[$edge.source$], labels[$edge.destination$]);
4.     $F_v$($edge.source$, $m$);
5.     $F_v$($edge.destination$, $m$);
6. }
End of $F_e$

FIG. 8

Algorithm ANG ($D$, $T$, $G$)
/* $D$ is the set of transaction records */
/* $T$ is the prefix tree with level and $T = \varnothing$ initially */
/* $G$ is the converted graph data of $D$ */

1. Build the 1-level prefix tree $T'$;
2. $T = T \cup T'$;
3. Scan $D$ once to obtain the support of each 1-itemset;
4. if (the support of a 1-itemset <= minimum support) the support of the 1-itemset is set to -1;
5. $k=2$;
6. Candidates_Generation ($k$, $T$);
7. while (Equation (2) is not satisfied)
8. {
9.     Apriori_c ($k$, $D$, $T$);
10.     $k$++;
11.     Candidates_Generation ($k$, $T$);
12. }
13. while ($k$-itemset candidates are not empty)
14. {
15.     Build $k$-level prefix tree $T'$ based on $T$;
16.     for each $k$-itemset candidate do
17.     {
18.         $s$ = FIM_CC ($G$, *candidate.attribute_set*);
19.         if ($s$ < minimum support) support of the $k$-itemset is set to -1; set corresponding support of $k$-itemset = $s$;
20.     $k$++;
21.     Candidates_Generation ($k$, $T$);
22.     }
23. }
End function

FIG. 9

METHOD FOR COMPUTING SUPPORT OF ITEMSET CANDIDATE BASED ON GRAPH STRUCTURE DATA AND APPLICATION THEREOF

TECHNICAL FIELD

The present disclosure generally relates to a field of association rules, and more particularly, to a method for computing a support of an itemset candidate based on graph structure data, a method for determining a frequent itemset using the same, and a method for determining a frequent itemset based on a prefix tree.

BACKGROUND

Data mining is to extract the previously unknown and potentially useful information from a large database. An association rule mining is one of the most important techniques in data mining. The association rule was first proposed in supermarket sales. A large supermarket collects a lot of transaction records, and a supermarket manager hopes to find useful information from these records that can help decision makers to draw up sale plans.

A transaction record contains a set of items, and in the supermarket for example, an item means a product. Let I be the set of all items, and X and Y respectively represent sets of some items, then, an association rule may like X→Y, where X is an antecedent of the association rule, and Y is a consequent of the association rule, and X, Y $\subset$ I, X∩Y=∅.

The association rule mining, in general, is divided into two steps: 1. finding all frequent itemsets; 2. producing all association rules based on the frequent itemsets found in the first step. The overall performance of the association rule mining is mainly depending on the first step since the second step is easy.

The Apriori algorithm based on a prefix tree is one of the most well-known and widely accepted methods to compute the frequent itemset. It needs to go through 2 steps to compute the frequent itemset having k items: 1. generating a k-itemset candidate based on a frequent (k-1)-itemset; 2. scanning a database to obtain a support of the k-itemset candidate, to further obtain a frequent k-itemset. The algorithm uses a prefix tree to represent frequent itemsets, and each node in the kth level represents a set of frequent k-itemsets.

However, as a depth of the algorithm increases a depth of the prefix tree increases, the algorithm consumes too much time in the second step of each cycle: scanning a database to obtain the support of the k-itemset candidate. This is because when the database is used for recursively traversing the prefix tree, the increase in the depth of the prefix tree unavoidably renders increase in the number of times for traversing the database, further resulting in considerable time consumption.

Therefore, it is necessary to improve the method for computing the support of the itemset candidate and the corresponding method for determining the frequent itemset.

SUMMARY

In view of defects and deficiencies in the prior art as described above, an objective of the present disclosure is to provide a new and improved method for computing a support of an itemset candidate based on graph structure data, a method for determining a frequent itemset using the same, and a method for determining the frequent itemset based on a prefix tree.

According to one aspect of the present disclosure, there is provided a method for computing a support of an itemset candidate based on graph structure data, comprising: converting data in a database to graph structure data, wherein, each vertex in the graph structure data represents a record in the database, and an edge between any two vertices represents an intersection of a set of items of two records corresponding to the two vertices; obtaining an itemset candidate from the database; obtaining a connected component corresponding to the itemset candidate in the graph structure data; determining the number of vertices included in the connected component; and determining the number of vertices as a support of the itemset candidate.

In the above-described method for computing a support of an itemset candidate based on graph structure data, the obtaining an itemset candidate from the database, specifically includes: obtaining a k-itemset candidate by using an Apriori algorithm based on a prefix tree, where k is an integer greater than 1.

Alternatively, in the above-described method for computing a support of an itemset candidate based on graph structure data, the obtaining an itemset candidate from the database, specifically includes: generating an itemset candidate with a hash table by using a DHP method.

In the above-described method for computing a support of an itemset candidate based on graph structure data, the determining the number of vertices included in the connected component, specifically includes: calculating the number of vertices in the connected component by one time of iteration, by using a connected component algorithm based on label transmission.

According to another aspect of the present disclosure, there is provided a method for determining a frequent itemset, comprising: obtaining a support of an itemset candidate, by using the above-described method for computing a support of an itemset candidate based on graph structure data; determining whether the support of the itemset candidate is greater than a predetermined threshold; and determining the itemset candidate as a frequent itemset, in a case where the support of the itemset candidate is greater than the predetermined threshold.

According to still another aspect of the present disclosure, there is provided a method for determining a frequent itemset based on a prefix tree, comprising: determining first time spent in recursively traversing a prefix tree having a depth of k by using a database; determining the number of k-itemset candidates, and multiplying the number of k-itemset candidates by time spent in computing a connected component once on a graph by using a graph computing method as second time; comparing the first time with the second time; performing recursive computation by using the database to determine a support of an itemset candidate, in a case where the first time is less than the second time; and obtaining the support of the itemset candidate by using the above-described method for computing a support of an itemset candidate based on graph structure data, in a case where the first time is greater than the second time.

The above-described method for determining a frequent itemset based on a prefix tree, further comprises: determining whether the obtained support of the itemset candidate is greater than a predetermined threshold; and determining the itemset candidate as a frequent itemset, in a case where the obtained support of the itemset candidate is greater than the predetermined threshold.

The above-described method for determining a frequent itemset based on a prefix tree, before the determining first time, further comprises: obtaining the k-itemset candidate by using an Apriori algorithm based on the prefix tree, where k is an integer greater than 1.

The above-described method for determining a frequent itemset based on a prefix tree, before the determining first time, further comprises: generating an itemset candidate with a hash table by using a DHP method.

According to a further aspect of the present disclosure, there is provided a device for computing a support of an itemset candidate based on graph structure data, comprising a memory and a processor, wherein, the memory has computer-executable instructions stored therein, which is operable to execute the method for computing the support of the itemset candidate based on the graph structure data as described above when the computer-executable instructions are executed by the processor.

According to a further aspect of the present disclosure, there is provided a device for determining a frequent itemset, comprising a memory and a processor, wherein, the memory has computer-executable instructions stored therein, which is operable to execute a method below when the computer-executable instructions are executed by the processor: obtaining a support of an itemset candidate by using the method for computing a support of an itemset candidate based on graph structure data as described above; determining whether the support of the itemset candidate is greater than a predetermined threshold; and determining the itemset candidate as a frequent itemset, in a case where the support of the itemset candidate is greater than the predetermined threshold.

According to a further aspect of the present disclosure, there is provided a device for determining a frequent itemset based on a prefix tree, comprising a memory and a processor, wherein, the memory has computer-executable instructions stored therein, which is operable to execute the method for determining the frequent itemset based on the prefix tree as described above when the computer-executable instructions are executed by the processor.

According to a further aspect of the present disclosure, there is provided a computer-readable storage medium, having computer-executable instructions stored thereon, which is operable to execute the method for computing the support of the itemset candidate based on the graph structure data as described above when the computer-executable instructions are executed by a computing device.

According to a further aspect of the present disclosure, there is provided a computer-readable storage medium, having computer-executable instructions stored thereon, which is operable to execute a method below, when the computer-executable instructions are executed by a computing device: obtaining a support of an itemset candidate by using the method for computing a support of an itemset candidate based on graph structure data as described above; determining whether the support of the itemset candidate is greater than a predetermined threshold; and determining the itemset candidate as a frequent itemset, in a case where the support of the itemset candidate is greater than the predetermined threshold.

According to a further aspect of the present disclosure, there is provided a computer-readable storage medium, having computer-executable instructions stored thereon, which is operable to execute the method for determining the frequent itemset based on the prefix tree as described above when the computer-executable instructions are executed by a computing device.

The method for computing a support of an itemset candidate based on graph structure data and the method for determining a frequent itemset using the same provided by the embodiments of the present disclosure can avoid spending too much time in obtaining the support of the itemset candidate by scanning the database, which improves efficiency of the algorithm while ensuring effectiveness of the algorithm.

In addition, the algorithm for determining a frequent itemset based on a prefix tree provided by the embodiment of the present disclosure performs modeling and analysis on a computing process of the Apriori algorithm based on the prefix tree, and optimizes the Apriori algorithm based on the prefix tree by using the method for implementing the Apriori algorithm based on the graph computing method, so as to improve efficiency of the Apriori algorithm based on the prefix tree when the depth is deeper.

DETAILED DESCRIPTION

The following is to disclose the present disclosure so as to enable those skilled in the art to implement the present disclosure. Preferred embodiments as described below are merely exemplary, and those skilled in the art may conceive of other obvious modifications. Basic principles the present disclosure defined in the following description may be used in other embodiments, modifications, improvements, equivalents, and other technical solutions without departing from the spirit and the scope of the present disclosure.

The terms and words used in the following description and claims are not limited to literal meanings, but are merely used by the inventor to enable a clear and consistent understanding of the present disclosure. Accordingly, it should be apparent to those skilled in the art that the following description of various embodiments of the present disclosure is provided for illustration only, rather than limiting the present disclosure as defined by the appended claims and their equivalents.

It can be understood that the term "a" or "an" should be understood as "at least one" or "one or more", i.e., in one embodiment, the number of one item may be one, and in other embodiments, the number of the item may be plural, and the term "a" or "an" cannot be understood as a limitation of quantity.

Although ordinal numbers such as "first", "second" will be used for describing various components, those components are not limited herein. The term is only used for distinguishing one component from another. For example, a first component may be referred to as a second component, and likewise, a second component may also be referred to as a first component, without departing from the teachings of the inventive concept. As used herein, the term "and/or" includes any and all combinations of one or more of associated items listed.

The terminology used herein is for describing various embodiments only and is not intended to limit the same. As used herein, a singular form is intended to include a plural form as well, unless otherwise clearly indicated by the context. It will be further understood that the terms "including" and/or "having", as used in the specification, specify presence of features, numbers, steps, operations, components, items or combinations thereof as described, and do not exclude presence or addition of one or more features, numbers, steps, operations, components, items or combinations thereof.

The technical terms or scientific terms here should be of general meaning as understood by those ordinarily skilled in the art, as long as the terms are not defined differently. It should be understood that the terms defined in commonly used dictionaries have meanings that are consistent with the meanings of terms in the prior art.

Hereinafter, the present disclosure will be further described in detail in conjunction with the accompanying drawings and specific embodiments.

As described above, because of deeper depth, an Apriori algorithm based on a prefix tree needs to spend a lot of time in scanning a database to obtain a support of an itemset candidate, which leads to a manifested low efficiency. Therefore, in a method for determining a frequent itemset based on a prefix tree according to an embodiment of the present disclosure, the support of the itemset candidate is computed by using a graph computing method, so as to determine a frequent itemset. In this way, the efficiency of the algorithm can be improved while ensuring the effectiveness of the algorithm, that is, the Apriori algorithm based on the prefix tree is used for optimization.

In the Apriori algorithm based on the prefix tree, it uses the prefix tree to express frequent itemsets and frequent itemset candidates. In an initial phase of the algorithm, a frequent 1-itemset is obtained by scanning the database once; next, the algorithm uses a frequent (k-1)-itemset to generate a k-itemset candidate, and then traverses the prefix tree iteratively based on the database to obtain a support of the k-itemset candidate, and to further obtain a frequent k-itemset.

Specifically, in the Apriori algorithm, the step of generating a k-itemset candidate based on a frequent (k-1)-itemset is specifically generating the k-itemset candidate based on 2 frequent (k-1)-itemsets, which is divided into two phases:

A generating phase: it is assumed that there are 2 frequent (k-1)-itemsets p and q, and the first (k-2) items of p and q are the same, then the same (k-2) items together with one item respectively left in p and q, a total of k items, compose the k-itemset candidate.

An inspecting phase: with respect to the generated k-itemset candidate, it is necessary to ensure that all its (k-1) levels of subsets are in a set of the frequent (k-1)-itemsets. This is because, with respect to a frequent k-itemset, it is affirmed that all its (k-1) levels of subsets are also frequent itemsets. Therefore, in a case where the generated k-itemset candidate does not have its (k-1) levels of subsets present in the set of the frequent (k-1)-itemsets, the k-itemset candidate should be removed from the set of the itemset candidates.

For example, it is assumed that there are already 3 sets of frequent itemsets present: {{1,2,3}, {1,2,4}, {1,3,4}, {1,3,5}, {2,3,4}}, two 4-itemset candidates may be generated in the generating phase: {1,2,3,4} (generated by {1,2,3} and {1,2,4}), {1,3,4,5} (generated by {1,3,4} and {1,3,5}).

In the inspecting phase, since a 3-level subset {3,4,5} is not present in a frequent 3-itemset, {1,3,4,5} should be removed from the 4-itemset candidate. In this way, there is only one 4-itemset candidate generated, namely {1,2,3,4}.

Although the above describes how the itemset candidate is extracted in the Apriori algorithm based on the prefix tree, in the method for computing a support of an itemset candidate based on graph structure data and the method for determining a frequent itemset using the same according to the embodiments of the present disclosure, it is not limited to only obtaining the itemset candidate by using the Apriori algorithm based on the prefix tree, the itemset candidate may be obtained by using other algorithms instead.

For example, the itemset candidate may be generated with a hash table by using a Direct Hashing and Pruning (DHP) method. Specifically, a hash function is defined firstly, and then a hash value is calculated for each itemset, and each itemset is scanned and put into a bucket corresponding to the hash table, and the itemsets are counted. In addition, only when there is one bucket whose counter is greater than a preset threshold, all itemsets corresponding to the hash value of the bucket are itemset candidates.

In this way, after the itemset candidate is obtained, it is necessary to determine the support of the itemset candidate, so as to determine the frequent itemset.

As described above, in the Apriori algorithm based on the prefix tree, the support of the itemset candidate is obtained by scanning the database. However, in the method for computing a support of an itemset candidate based on graph structure data and the method for determining a frequent itemset using the same according to the embodiments of the present disclosure, the support of the itemset candidate is computed by using the graph computing method, so as to determine the frequent itemset.

Figure 1:
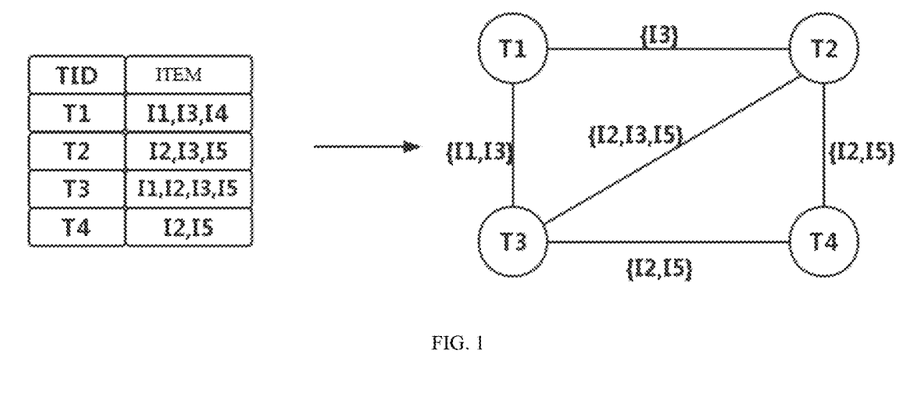
FIG. 1 is an exemplary diagram of a process of converting a database record to graph structure data according to an embodiment of the present disclosure.

Specifically, in order to determine the frequent itemset by using the graph computing method, it is firstly necessary to convert data to graph structure data. A record in the database includes its own id number and a set of items. Therefore, the data may be converted to the graph structure data according to rules below: 1. each vertex in the graph represents a record in the database, and an id number of the record is just an id number of the vertex; 2. there is an edge between two vertices in the graph if and only if an intersection of the set of items of the records corresponding to the two vertices is not empty, and the intersection is just an attribute of the edge, as shown in FIG. 1. Here, FIG. 1 is an exemplary diagram of a process of converting a record in the database to graph structure data according to the embodiment of the present disclosure.

With respect to a given frequent k-itemset candidate, its counter is the counter of all records including the k-itemset candidate in the database. Mapped to a graph structure, the record corresponds to a vertex in the graph, so if two records have an intersection, then there is an edge between the corresponding two vertices, as mapped to the graph, and the attribute of the edge is just a set of the intersection of the two records.

Therefore, if the edge including the k-itemset candidate in the graph is defined as an active edge, and other edges are inactive edges (which are deemed to be not present in this time of computation), then vertices corresponding to records including the k-itemset candidate constitute a connected component, and vertices corresponding to records not including the k-itemset candidate are all isolated vertices (without any edge). Therefore, the support of the k-itemset candidate is just the number of vertices included in the connected component in this time of computation. That is, in the embodiment of the present disclosure, by research of relationship between a graph data structure and the support of the itemset, it is determined that the number of vertices in the connected component in the above-described graph structure data is just the support of the itemset candidate corresponding thereto.

In this way, in the method for computing the support of the itemset candidate based on the graph structure data and the method for determining the frequent itemset using the same according to the embodiments of the present disclosure, the support of the itemset candidate is determined according to the number of vertices included in the connected component corresponding to the itemset candidate, so as to determine whether the itemset candidate is the frequent itemset.

Therefore, when the graph computing method is used for determining the frequent itemset, it is only necessary to compute several connected components (depending on the number of itemset candidates), and then count the number of vertices in the connected components. It should be noted that, when the graph computing method is used for determining the frequent itemset, the connected component to be obtained is actually a special connected component: all vertices in the connected component have an edge therebetween. Therefore, when a connected component algorithm based on label transmission is used, only one time of iteration is required to calculate the number of vertices in the connected components.

A specific implementing process of the connected component algorithm based on label transmission is as follows: with respect to each vertex in a piece of ordinary graph structure data, a label (whose initial value is its id) is set, and then iteration is started.

One time of iteration: all edges in the graph are traversed; with respect to each edge, label values of endpoints thereof are compared, and a label value of a vertex with a larger label value is set as a label value of a vertex with a smaller label value.

Iteration ending condition: there is no vertex whose label value changes in one time of iteration.

In addition, as shown in FIG. 1, in the method for computing a support of an itemset candidate based on graph structure data according to the embodiment of the present disclosure, the graph structure data obtained by conversion is special; and with respect to a fixed k-itemset candidate, only the edge including the k-itemset candidate is valid, so a connected component and the remaining isolated vertices are obtained. Therefore, with respect to a k-itemset candidate, only one connected component will be obtained by executing the connected component algorithm, and the connected component is the k-itemset candidate corresponding thereto.

Figure 2A:
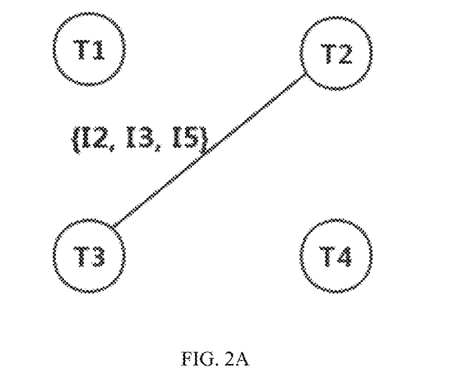
FIG. 2A and FIG. 2B are schematic diagrams illustrating connected components corresponding to itemset candidates shown in FIG. 1.
Figure 2B:
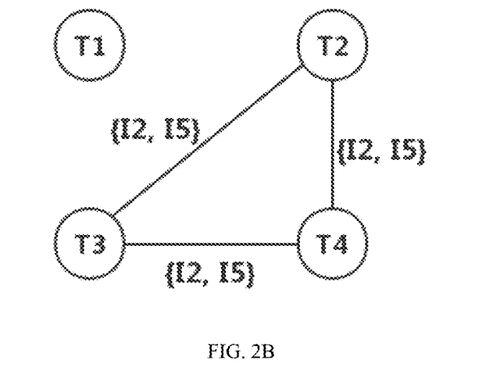

For example, as shown in FIG. 2A, a connected component of an itemset candidate {I2, I3, I5} in FIG. 1 is shown, and the connected component includes two vertices T2 and T3, so a support of the itemset candidate {I2, I3, I5} is 2. For another example, as shown in FIG. 2B, a connected component of an itemset candidate {I2, I5} in FIG. 1 is shown, and the connected component includes three vertices T2, T3 and T4, so a support of the itemset candidate {I2, I5} is 3. Here, FIG. 2A and FIG. 2B are schematic diagrams illustrating the connected components corresponding to the itemset candidates shown in FIG. 1.

In summary, according to one aspect of the embodiment of the present disclosure, there is provided the method for computing a support of an itemset candidate based on graph structure data, comprising: converting data in a database to graph structure data, wherein, each vertex in the graph structure data represents a record in the database, and an edge between any two vertices represents an intersection of a set of items of two records corresponding to the two vertices; obtaining an itemset candidate from the database; obtaining a connected component corresponding to the itemset candidate in the graph structure data; determining the number of vertices included in the connected component; and, determining the number of vertices as a support of the itemset candidate.

Figure 3:
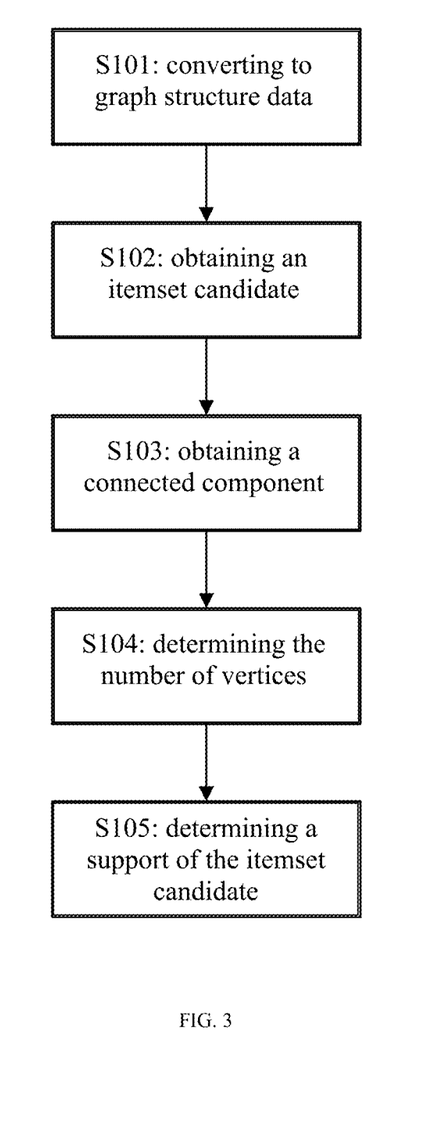
FIG. 3 is a schematic flow chart illustrating a method for computing a support of an itemset candidate based on graph structure data according to an embodiment of the present disclosure.

FIG. 3 is a schematic flow chart illustrating a method for computing a support of an itemset candidate based on graph structure data according to an embodiment of the present disclosure. As shown in FIG. 3, the method for computing a support of an itemset candidate based on graph structure data according to the embodiment of the present disclosure comprises: S101: converting data in a database to graph structure data, wherein, each vertex in the graph structure data represents a record in the database, and an edge between any two vertices represents an intersection of a set of items of the two records corresponding to the two vertices; S102: obtaining an itemset candidate from the database; S103: obtaining a connected component corresponding to the itemset candidate in the graph structure data obtained in step S1; S104: determining the number of vertices included in the connected component; and S105: determining the number of vertices as the support of the itemset candidate.

In the above-described method for computing a support of an itemset candidate based on graph structure data, the step of obtaining an itemset candidate from the database, specifically includes: obtaining the k-itemset candidate by using the Apriori algorithm based on the prefix tree, where k is an integer greater than 1.

Alternatively, in the above-described method for computing a support of an itemset candidate based on graph structure data, the step of obtaining an itemset candidate from the database, specifically includes: generating the itemset candidate with the hash table by using the DHP method.

Here, the specific processes of obtaining the itemset candidate by using the Apriori algorithm based on the prefix tree and by using the DHP method have already been described above, which will not be repeated here.

In the above-described method for computing a support of an itemset candidate based on graph structure data, the step of determining the number of vertices included in the connected component, specifically includes: calculating the number of vertices in the connected component by one time of iteration, by using the connected component algorithm based on label transmission.

In this way, the method for computing a support of an itemset candidate based on graph structure data according to the embodiment of the present disclosure may avoid spending too much time in obtaining the support of the itemset candidate by scanning the database, which improves efficiency of the algorithm while ensuring effectiveness of the algorithm.

After the method for computing a support of an itemset candidate based on graph structure data according to the embodiment of the present disclosure is used for obtaining the support of the itemset candidate; on the one hand, it may be used in determining whether the itemset candidate is a frequent itemset, which will be further described below in detail; on the other hand, the obtained support of the itemset candidate may be further used in a subsequent process in the association rule, and is not limited to determining whether the itemset candidate is the frequent itemset.

Therefore, according to another aspect of the embodiment of the present disclosure, there is provided a method for determining a frequent itemset, comprising: obtaining a support of an itemset candidate by using the method for computing a support of an itemset candidate based on graph structure data as described above; determining whether the support of the itemset candidate is greater than a predetermined threshold; and determining the itemset candidate as a frequent itemset, in a case where the support of the itemset candidate is greater than the predetermined threshold.

Figure 4:
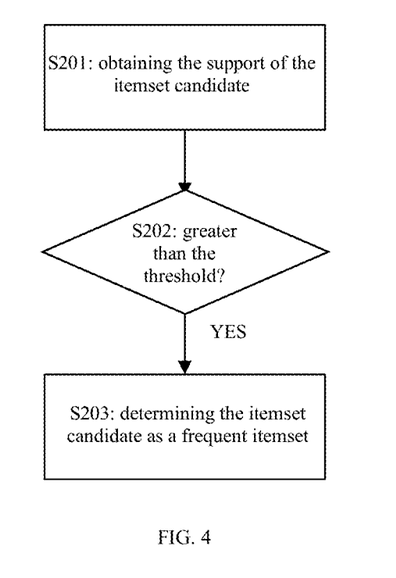
FIG. 4 is a schematic flow chart illustrating a method for determining a frequent itemset according to an embodiment of the present disclosure.

FIG. 4 is a schematic flow chart illustrating the method for determining a frequent itemset according to an embodiment of the present disclosure. As shown in FIG. 4, the method for determining a frequent itemset according to the embodiment of the present disclosure comprises: S201: obtaining a support of an itemset candidate by using the method for computing a support of an itemset candidate based on graph structure data as described above; S202: determining whether the support of the itemset candidate is greater than the predetermined threshold; and S203: determining the itemset candidate as a frequent itemset, in a case where the support of the itemset candidate is greater than the predetermined threshold.

That is to say, after the support of the itemset candidate is computed based on the above-described method, if a support of a certain itemset candidate is greater than the predetermined threshold, the itemset candidate is determined as a frequent itemset. Therefore, the method for determining a frequent itemset according to the embodiment of the present disclosure may, by using the method for computing a support of an itemset candidate based on graph structure data, avoids spending too much time in obtaining the support of the itemset candidate by scanning the database, which improves efficiency of the algorithm while ensuring effectiveness of the algorithm.

As described above, in an existing Apriori algorithm based on the prefix tree, in an initial phase of the algorithm, a frequent 1-itemset is obtained by scanning the database once; next, the algorithm uses a frequent (k-1)-itemset to generate a k-itemset candidate, and then traverses the prefix tree iteratively based on the database to obtain a support of the k-itemset candidate, and to further obtain a frequent k-itemset. In the algorithm, when a value k is small, a size of a set of itemset candidates is very large, and therefore, computing the frequent itemset by using the graph computing method may be very inefficient. However, as the value k increases, the size of the set of itemset candidates sharply decreases, and the computing the frequent itemset by using the graph computing method is also more efficient. Meanwhile, the existing Apriori algorithm based on the prefix tree needs to use the database for traversing the prefix tree iteratively, so as to compute the counter of the itemset candidate, and when the value k becomes larger, the efficiency of the Apriori algorithm becomes lower.

Therefore, based on the above-described problem, the embodiment of the present disclosure further proposes an optimized model of the Apriori algorithm based on the prefix tree, wherein, for iteratively traversing based on the database, the existing Apriori algorithm is used when the value k is relatively small, and the graph computing method is used when the value k is large to a certain extent.

Firstly, determination of a switching vertex value k will be described.

In a computing process, the number of k-itemset candidates may be known. Time spent in computing the connected component once on a graph by using the graph computing method is also known. Therefore, time spent in computing the frequent k-itemset by using the graph computing method may be estimated.

With respect to the k-itemset candidate, the Apriori algorithm based on the prefix tree uses the database for recursively traversing the prefix tree with a depth of k. Time spent in traversing once with a depth of k may be estimated as: time spent in traversing once with a depth of k-1+ (time spent in traversing once with a depth of k-1− time spent in traversing once with a depth of k-2). The number of times of traversing may be estimated by computing a combinatorial number of the value k through the record of the database. By multiplying the two pieces of data, time for the Apriori algorithm to compute the frequent k-itemset may be roughly estimated.

Then, the switching vertex value k is determined by comparing the two time periods.

That is to say, by optimizing the Apriori algorithm based on the prefix tree, a method for determining the frequent itemset based on the prefix tree is obtained.

In this way, according to another aspect of the embodiment of the present disclosure, there is provided a method for determining a frequent itemset based on a prefix tree, comprising: determining first time spent in recursively traversing a prefix tree having a depth of k by using a database; determining the number of k-itemset candidates, and multiplying the number of k-itemset candidates by time spent in computing a connected component once on a graph by using a graph computing method as second time; comparing the first time with the second time; performing recursive computation by using the database to determine a support of an itemset candidate, in a case where the first time is less than the second time; and obtaining the support of the itemset candidate by using the above-described method for computing the support of the itemset candidate based on the graph structure data, in a case where the first time is greater than the second time.

Figure 5:
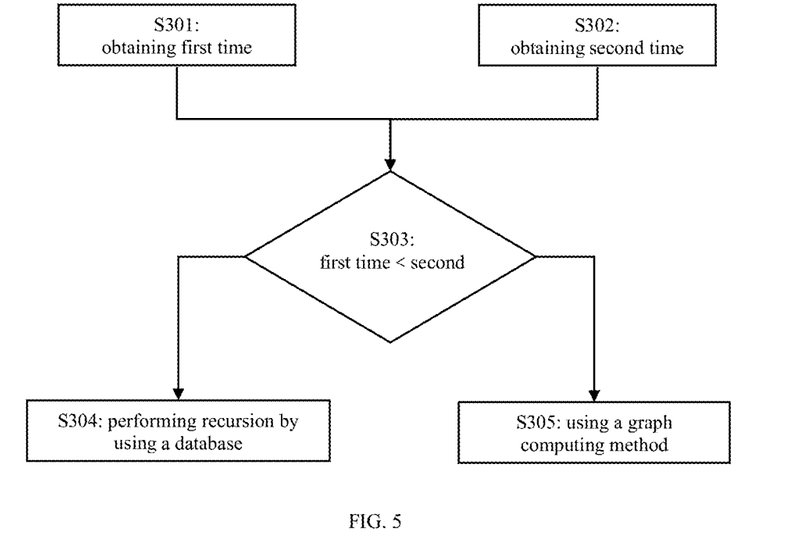
FIG. 5 is a schematic flow chart illustrating an optimized method for determining a frequent itemset based on a prefix tree according to an embodiment of the present disclosure.

FIG. 5 is a schematic flow chart illustrating an optimized method for determining a frequent itemset based on a prefix tree according to an embodiment of the present disclosure. As shown in FIG. 5, the optimized method for determining a frequent itemset based on a prefix tree according to the embodiment of the present disclosure, comprises: S301: determining first time spent in recursively traversing a prefix tree having a depth of k by using a database; S302: determining the number of k-itemset candidates, and multiplying the number of k-itemset candidates by time spent in computing a connected component once on a graph by using a graph computing method as second time; S303: comparing the first time with the second time, that is, judging whether the first time is greater than the second time; S304: performing recursive computation by using the database to determine a support of an itemset candidate, in a case where the first time is less than the second time; and S305: obtaining the support of the itemset candidate by using the above-described method for computing a support of an itemset candidate based on graph structure data, in a case where the first time is greater than the second time.

Similarly, the above-described method for determining a frequent itemset based on a prefix tree, further comprises: determining whether the obtained support of the itemset candidate is greater than a predetermined threshold; and, determining the itemset candidate as a frequent itemset, in a case where the obtained support of the itemset candidate is greater than the predetermined threshold.

In addition, the above-described method for determining a frequent itemset based on a prefix tree, before the determining first time, further comprises: obtaining the k-itemset candidate, by using an Apriori algorithm based on the prefix tree, where k is an integer greater than 1.

Alternatively, the above-described method for determining a frequent itemset based on a prefix tree, before the determining first time, further comprises: generating the itemset candidate with a hash table by using a DHP method.

Therefore, an embodiment of the present disclosure further provides an optimized method for determining a frequent itemset based on a prefix tree, which performs modeling and analysis on a computing process of the Apriori algorithm based on the prefix tree, and optimizes the Apriori algorithm based on the prefix tree by using the method for implementing the Apriori algorithm based on the graph computing method, so as to improve efficiency of the Apriori algorithm based on the prefix tree when the depth is deeper.

Figure 6:
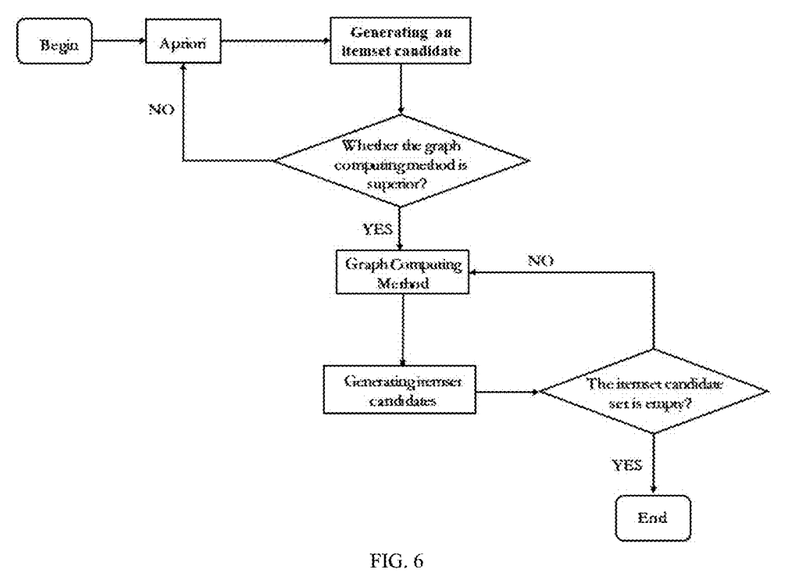
FIG. 6 is a schematic diagram of an example of an optimized Apriori algorithm based on a prefix tree according to an embodiment of the present disclosure.

FIG. 6 is a schematic diagram of an example of an optimized Apriori algorithm based on a prefix tree according to an embodiment of the present disclosure. As shown in FIG. 6, after the algorithm starts, firstly, the Apriori algorithm based on the prefix tree is run to generate an itemset candidate, and then, whether a graph computing method is better is evaluated. If the result is NO, the Apriori algorithm based on the prefix tree is run continuously to compute a support of an itemset candidate, so as to obtain an itemset candidate whose support is greater than a predetermined threshold, as a frequent itemset. Reversely, if the result is YES, that is, the graph computing method is better, the support of the itemset candidate is computed by using the above-described method based on the graph structure data, so as to obtain the itemset candidate whose support is greater than the predetermined threshold, as the frequent itemset. Then, it is judged whether an itemset candidate whose support is not computed is empty, if NO, it represents that there is still an itemset candidate whose support is not computed, and the support of the itemset candidate is computed by using the graph computing method. Finally, if the itemset candidate whose support is not computed is empty, it indicates that supports of all itemset candidates have been computed, so that the frequent itemset in the itemset candidate is determined, and the algorithm ends.

Figure 7:
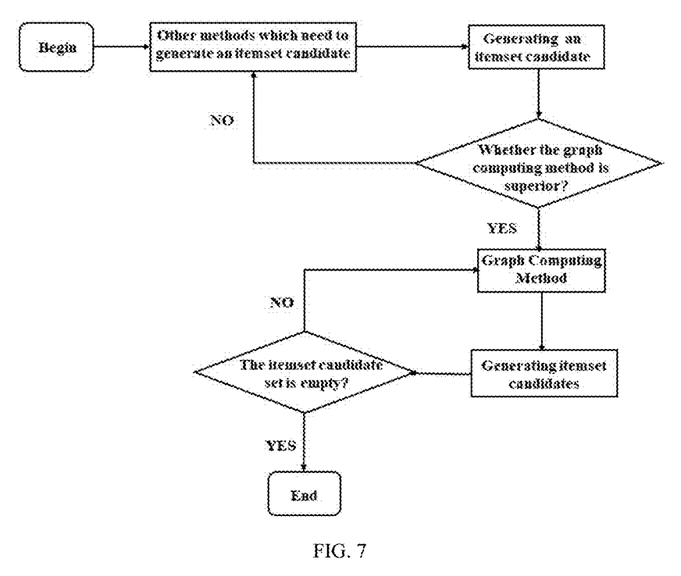
FIG. 7 is a schematic diagram of another example of an optimized algorithm for determining a frequent itemset according to an embodiment of the present disclosure.

FIG. 7 is a schematic diagram of another example of an optimized algorithm for determining a frequent itemset according to an embodiment of the present disclosure. As shown in FIG. 7, as compared with the optimized Apriori algorithm based on the prefix tree according to the embodiment of the present disclosure as shown in FIG. 6, it differs in a method for obtaining an itemset candidate. That is, in the example shown in FIG. 7, instead of the Apriori algorithm based on the prefix tree used for obtaining the itemset candidate, other methods for generating the itemset candidate are used for obtaining the itemset candidate. Thereafter, a process of the example shown in FIG. 7 is the same as that of the example shown in FIG. 6 as described above, which will not be described here.

Figure 8:
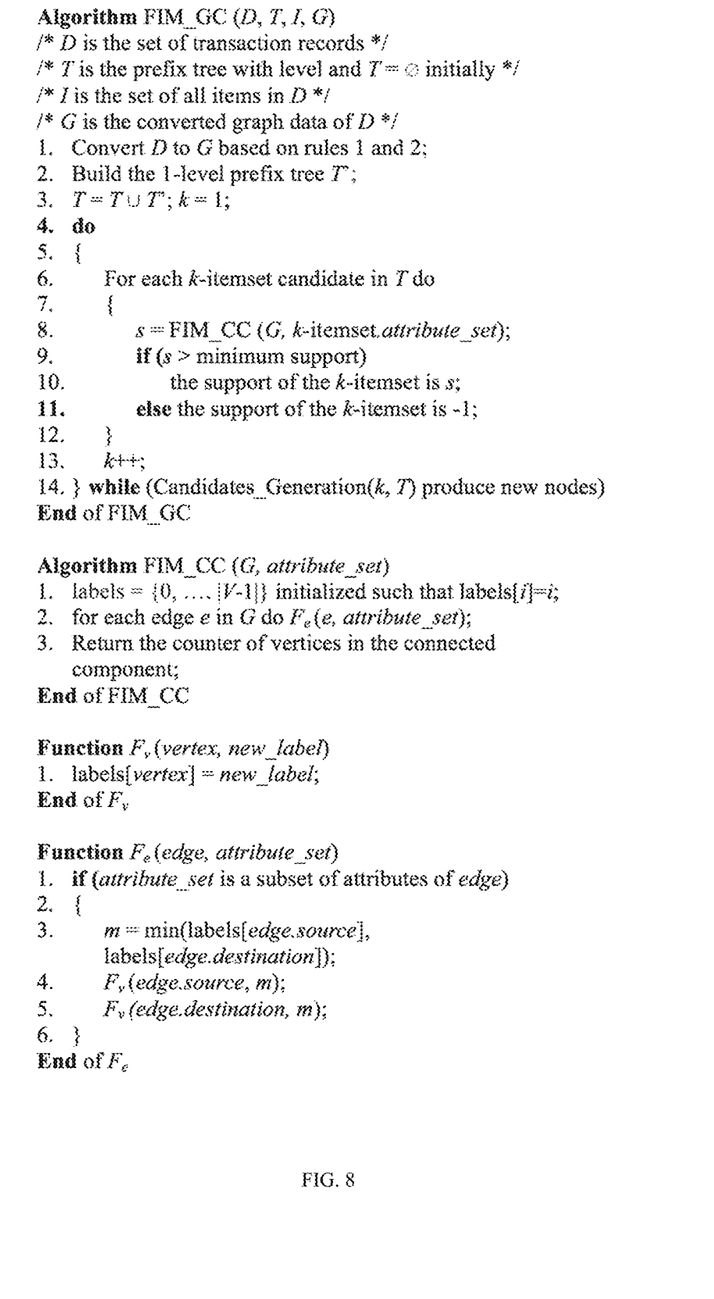
FIG. 8 is a pseudocode diagram of an algorithm for computing a support of a k-itemset candidate by using a graph computing method according to an embodiment of the present disclosure.

FIG. 8 is a pseudocode diagram of an algorithm for computing a support of a k-itemset candidate by using a graph computing method according to an embodiment of the present disclosure. As shown in FIG. 8, an FIM_CC (G, attribute_set) function executes a connected component algorithm on graph data once, in this time of computation, an edge is deemed to be valid only when the edge includes the attribute_set. The connected component algorithm transfers with a label, an Fe (edge, attribute_set) function executes specific label transfer, and an Fv (vertex, new_label) function modifies a label of a vertex. In addition, an FIM_GC (D, T, I, G) function counts a support of each itemset candidate, computes a frequent itemset, and writes a result into a prefix tree. The FIM_GC (D, T, I, G) function ends when no itemset candidate is generated.

Figure 9:
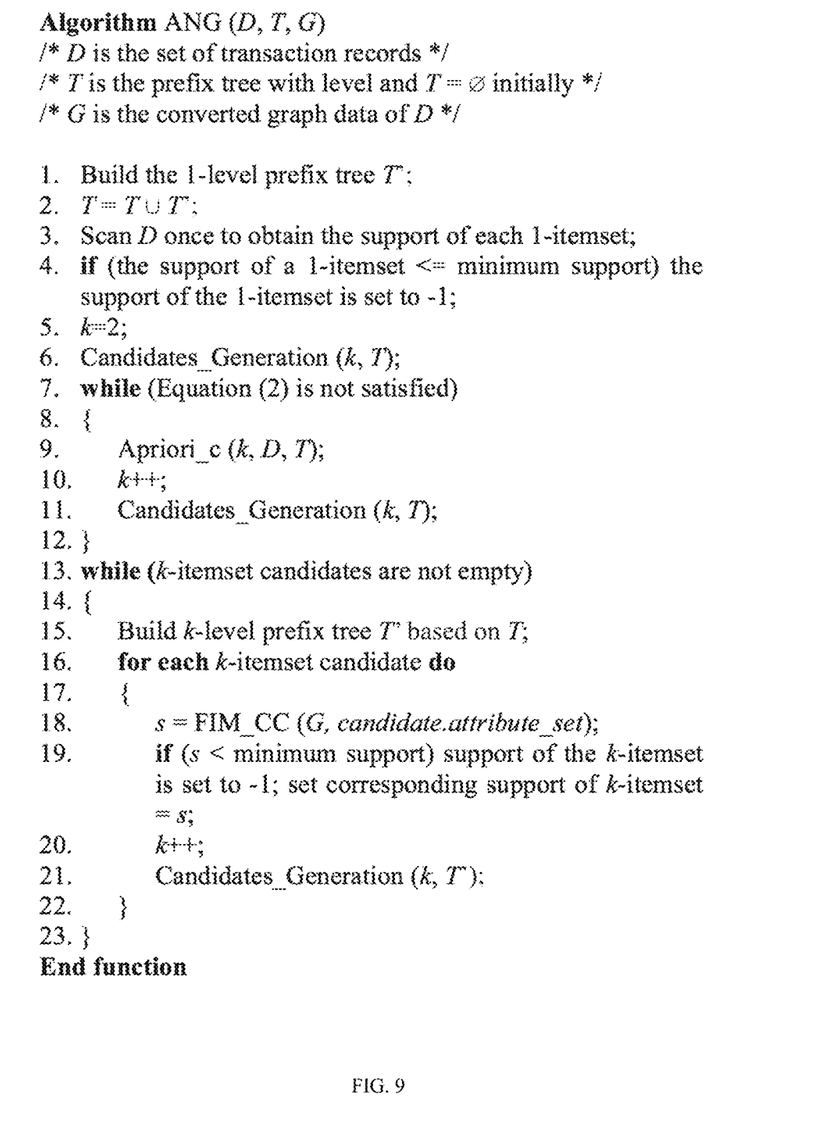
FIG. 9 is a pseudocode diagram of an optimized method of an Apriori algorithm based on a prefix tree according to an embodiment of the present disclosure.

FIG. 9 is a pseudocode diagram of an optimized method of an Apriori algorithm based on a prefix tree according to an embodiment of the present disclosure. As shown in FIG. 9, an ANG (D, T, G) function combines Apriori with a graph computing method, which uses Apriori in an initial phase of the algorithm, and switches to the graph computing method, when estimated time consumption of graph computing is less than that of Apriori. It is an itemset candidate only when a support of the itemset candidate is greater than a preset threshold; otherwise, it isn't (marked as −1). The algorithm ends when a set of generated itemset candidates is an empty set.

The method for computing a support of an itemset candidate based on graph structure data and the method for determining a frequent itemset using the same provided by the embodiments of the present disclosure may avoid spending too much time in obtaining the support of the itemset candidate by scanning the database, which improves efficiency of the algorithm while ensuring effectiveness of the algorithm.

In addition, the method for determining a frequent itemset based on a prefix tree provided by the embodiment of the present disclosure performs modeling and analysis on a computing process of the Apriori algorithm based on a prefix tree, and optimizes the Apriori algorithm based on the prefix tree by using the method for implementing the Apriori algorithm based on the graph computing method, so as to improve efficiency of the Apriori algorithm based on the prefix tree when the depth is deeper.

According to a further aspect of the embodiment of the present disclosure, there is provided a device for computing a support of an itemset candidate based on graph structure data, comprising a memory and a processor, wherein, the memory has computer-executable instructions stored therein, which is operable to execute the method for computing the support of the itemset candidate based on the graph structure data as described above when the computer-executable instructions are executed by a controller. Here, the method for computing a support of an itemset candidate based on graph structure data according to the embodiment of the present disclosure has been described above, and will not be repeated in order to avoid redundancy.

According to a further aspect of the embodiment of the present disclosure, there is provided a device for determining a frequent itemset, comprising a memory and a processor, wherein, the memory has computer-executable instructions stored therein, which is operable to execute a method below when the computer-executable instructions are executed by a controller: obtaining a support of an itemset candidate by using the method for computing the support of the itemset candidate based on the graph structure data as described above; determining whether the support of the itemset candidate is greater than a predetermined threshold; and determining the itemset candidate as a frequent itemset, in a case where the support of the itemset candidate is greater than the predetermined threshold. Similarly, the method for computing a support of an itemset candidate based on graph structure data according to the embodiment of the present disclosure has been described above, and will not be repeated in order to avoid redundancy.

According to a further aspect of the embodiment of the present disclosure, there is provided a device for determining a frequent itemset based on a prefix tree, comprising a memory and a processor, wherein, the memory has computer-executable instructions stored therein, which is operable to execute the method for determining the frequent itemset based on the prefix tree as described above, when the computer-executable instructions are executed by a controller. Here, the method for determining the frequent itemset based on the prefix tree according to the embodiment of the present disclosure has been described above, and will not be repeated in order to avoid redundancy.

According to a further aspect of the embodiment of the present disclosure, there is provided a computer-readable storage medium, having computer-executable instructions stored thereon, which is operable to execute the method for computing the support of the itemset candidate based on the graph structure data as described above when the computer-executable instructions are executed by a computing device. Here, the method for computing a support of an itemset candidate based on graph structure data according to the embodiment of the present disclosure has been described above, and will not be repeated in order to avoid redundancy.

According to a further aspect of the embodiment of the present disclosure, there is provided a computer-readable storage medium, having computer-executable instructions stored thereon, which is operable to execute a method below when the computer-executable instructions are executed by a computing device: obtaining a support of an itemset candidate by using the method for computing a support of an itemset candidate based on graph structure data as described above; determining whether the support of the itemset candidate is greater than a predetermined threshold; and determining the itemset candidate as a frequent itemset, in a case where the support of the itemset candidate is greater than the predetermined threshold. Similarly, the method for computing a support of an itemset candidate based on graph structure data according to the embodiment of the present disclosure has been described above, and will not be repeated in order to avoid redundancy.

According to a further aspect of the embodiment of the present disclosure, there is provided a computer-readable storage medium, having computer-executable instructions stored thereon, which is operable to execute the method for determining the frequent itemset based on the prefix tree as described above when the computer-executable instructions are executed by a computing device. Here, the method for determining a frequent itemset based on a prefix tree according to the embodiment of the present disclosure has been described above, and will not be repeated in order to avoid redundancy.

The invention can be applied in many fields. Some examples are given below.

Supermarkets receive a lot of consumer data every day, and each piece of data looks like a collection of products. How to effectively use these mass data is very important for decision makers in supermarkets. The association rules can be used to find the relationship between different commodities in the supermarket transaction database.

For example, if we find out from these mass consumption records that the quantity of items purchased at the same time, {butter, bread, milk}, and the number of items that have purchased {butter, milk} at the same time are very high, an accurate comparison can be drawn. Assumption: Customers who purchase {butter, milk} have a great chance to purchase {bread} at the same time. Such assumptions can help supermarket decision makers formulate sales strategies and product placement strategies.

For different association rules obtained in different regions, supermarket decision makers can also make targeted supermarket strategies. In turn, the promotion of supermarkets to better serve the public can also lead to more lucrative profits and cost savings.

A classic example: Wal-Mart has conducted a detailed analysis of more than a year of raw transaction data in data warehouses and found that the most purchased product along with diapers turned out to be beer. Using data warehousing and association rules, this fact is hidden behind the fact that women in the U.S. often try to buy diapers for their children after they go to work, and 30% to 40% of husbands buy their own diapers after buying diapers. Beer. Based on this finding, Wal-Mart adjusted the position of the shelves, sold diapers and beer together, and greatly increased sales.

Association rules can also be applied to book (video) recommendations. For example, in a reading system, if the vast majority of people who have seen Book A also read Book B, then the system can recommend Book B to readers who have read Book A. Same as books.

Association rule analysis also has great potential in areas such as the financial industry, search engines, and smart recommendations, such as bank customer cross-selling analysis, search word recommendation or identification anomalies, and interest-based real-time news recommendations.

It should be understood by those skilled in the art that the embodiments of the present disclosure as described above and shown in the drawings are only examples and do not limit the present disclosure. The objective of the present disclosure has been fully and effectively achieved. The functional and structural principles of the present disclosure have been shown and described in the embodiments; and any transformation or modification may be made to the implementing modes of the present disclosure without departing from the principles.

The invention claimed is:

1. A computer executed method for determining a frequent itemset in a database based on a prefix tree, comprising:
retrieving data records stored in the database over a network;
converting the retrieved data records to graph structure data of a graph, wherein, each vertex in the graph structure data represents a record in the database, and an edge between any two vertices represents an intersection of a set of items of two data records corresponding to the two vertices;
obtaining an itemset candidate from the database;

obtaining a connected component corresponding to the itemset candidate in the graph structure data, wherein the connected component comprises vertices corresponding to data records including the itemset candidate;

determining a first time spent in recursively traversing the prefix tree having a depth of k, wherein k is an integer greater than 1, and each node in the kth level represents a set of frequent k-itemsets;

determining a second time by multiplying a determined number of k-itemset candidates by time spent in computing the connected component once in the graph;

comparing the first time with the second time;

when the first time is less than the second time, obtaining a support of the itemset candidate by recursively traversing the database;

when the first time is greater than the second time, obtaining the support of the itemset candidate based on the graph structure data including:
  determining a number of vertices included in the connected component; and
  determining the number of vertices as the support of the itemset candidate; and determining the itemset candidate as the frequent itemset based on the obtained support of the item set candidate.

2. The method according to claim 1, further comprising:
determining whether the obtained support of the itemset candidate is greater than a predetermined threshold; and
determining the itemset candidate as the frequent itemset when the obtained support of the itemset candidate is greater than the predetermined threshold.

3. The method according to claim 1, further comprising:
before the determining the first time, obtaining the k-itemset candidates by using an Apriori algorithm based on the prefix tree.

4. The method according to claim 1, further comprising:
before the determining the first time, generating the itemset candidate with a hash table by using a Direct Hashing and Pruning (DHP) method.

5. The method according to claim 1, wherein, the determining the number of vertices included in the connected component includes:
calculating the number of vertices in the connected component by one time of iteration, by using a connected component algorithm based on label transmission.

6. A device for determining a frequent itemset in a database based on a prefix tree, comprising a memory and a processor, wherein, the memory has computer-executable instructions stored therein, which is operable by the processor to execute a method including steps of:
retrieving data records stored in the database over a network;
converting the retrieved data records to graph structure data of a graph, wherein, each vertex in the graph structure data represents a record in the database, and an edge between any two vertices represents and intersection of a set of items of two data records corresponding to the two vertices;
obtaining an itemset candidate from the database;
obtaining a connected component corresponding to the itemset candidate in the graph structure data, wherein the connected component comprises vertices corresponding to data records including the itemset candidate;
determining a first time spent in recursively traversing the prefix tree having a depth of k, wherein k is an integer greater than 1, and each node in the kth level represents a set of frequent k-itemsets;

determining a second time by multiplying a determined number of k-itemset candidates by time spent in computing the connected component once in the graph;

comparing the first time with the second time;

when the first time is less than the second time, obtaining a support of the itemset candidate by recursively traversing the database;

when the first time is greater than the second time, obtaining the support of the itemset candidate based on the graph structure data including:
  determining a number of vertices included in the connected component; and
  determining the number of vertices as the support of the itemset candidate; and determining the itemset candidate as the frequent itemset based on the obtained support of the itemset candidate.

7. The device according to claim 6, wherein the method further comprising:
determining whether the obtained support of the itemset candidate is greater than a predetermined threshold; and
determining the itemset candidate as the frequent itemset when the obtained support of the itemset candidate is greater than the predetermined threshold.

8. The device according to claim 6, wherein the method further comprising:
before the determining the first time, obtaining the k-itemset candidates by using an Apriori algorithm based on the prefix tree.

9. The device according to claim 6, wherein the method further comprising:
before the determining the first time, generating the itemset candidate with a hash table by using a Direct Hashing and Pruning (DHP) method.

10. The device according to claim 6, wherein the determining the number of vertices included in the connected component includes:
calculating the number of vertices in the connected component by one time of iteration, by using a connected component algorithm based on label transmission.

11. A non-transitory computer-readable storage medium, having computer-executable instructions stored thereon, which is operable to execute a method for determining a frequent itemset in a database based on a prefix tree including steps of:
retrieving data records stored in the database over a network;
converting the retrieved data records to graph structure data of a graph, wherein, each vertex in the graph structure data represents a record in the database, and an edge between any two vertices represents an intersection of a set of items of two data records corresponding to the two vertices;
obtaining an itemset candidate from the database;
obtaining a connected component corresponding to the itemset candidate in the graph structure data, wherein the connected component comprises vertices corresponding to data records including the itemset candidate;
determining a first time spent in recursively traversing the prefix tree having a depth of k, wherein k is an integer greater than 1, and each node in the kth level represents a set of frequent k-itemsets;

determining a second time by multiplying a determined number of k-itemset candidates by time spent in computing the connected component once in the graph;

comparing the first time with the second time;

when the first time is less than the second time, obtaining a support of the itemset candidate by recursively traversing the database;

when the first time is greater than the second time, obtaining the support of the itemset candidate based on the graph structure data including:

determining a number of vertices included in the connected component; and determining the number of vertices as the support of the itemset candidate; and determining the itemset candidate as the frequent itemset based on the obtained support of the itemset candidate.

12. The computer-readable storage medium according to claim 11, wherein the method further comprising:

determining whether the obtained support of the itemset candidate is greater than a predetermined threshold; and determining the itemset candidate as the frequent itemset when the obtained support of the itemset candidate is greater than the predetermined threshold.

13. The computer-readable storage medium according to claim 11, wherein the method further comprising:

before the determining the first time, obtaining the k-itemset candidates by using an Apriori algorithm based on the prefix tree.

14. The computer-readable storage medium according to claim 11, wherein the method further comprising:

before the determining the first time, generating the itemset candidate with a hash table by using a Direct Hashing and Pruning (DHP) method.

15. The computer-readable storage medium according to claim 11, wherein the determining the number of vertices included in the connected component includes:

calculating the number of vertices in the connected component by one time of iteration, by using a connected component algorithm based on label transmission.

* * * * *